United States Patent
Kinney

(10) Patent No.: US 7,676,800 B2
(45) Date of Patent: Mar. 9, 2010

(54) METHOD AND APPARATUS FOR REDUCING THE STORAGE OVERHEAD OF PORTABLE EXECUTABLE (PE) IMAGES

(75) Inventor: Michael D. Kinney, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1508 days.

(21) Appl. No.: 10/783,787

(22) Filed: Feb. 20, 2004

(65) Prior Publication Data

US 2005/0188368 A1 Aug. 25, 2005

(51) Int. Cl.
*G06F 9/44* (2006.01)
*G06F 9/00* (2006.01)

(52) U.S. Cl. .............. 717/162; 717/120; 717/168; 717/171; 713/1; 713/2

(58) Field of Classification Search ............. 717/120, 717/162, 168, 171; 713/1–2
See application file for complete search history.

(56) References Cited

U.S. PATENT DOCUMENTS

| | | | | |
|---|---|---|---|---|
| 5,901,310 | A * | 5/1999 | Rahman et al. ............... | 713/1 |
| 6,243,421 | B1 * | 6/2001 | Nakajima et al. ...... | 375/240.25 |
| 6,463,583 | B1 * | 10/2002 | Hammond ................ | 717/162 |
| 6,635,088 | B1 * | 10/2003 | Hind et al. ................ | 715/236 |
| 6,654,386 | B2 * | 11/2003 | Nahapetian et al. ........ | 370/474 |
| 6,978,363 | B2 * | 12/2005 | Larvoire ................ | 713/1 |
| 2003/0014622 | A1 * | 1/2003 | Larvoire ................ | 713/2 |
| 2003/0154471 | A1 * | 8/2003 | Teachman et al. .......... | 717/171 |
| 2004/0015712 | A1 * | 1/2004 | Szor ......................... | 713/200 |
| 2006/0156285 | A1 * | 7/2006 | Jensen et al. .............. | 717/120 |
| 2006/0190939 | A1 * | 8/2006 | Chen et al. ................ | 717/168 |

OTHER PUBLICATIONS

ECMA-335 Partition II—Metadata Definition and Semantics, http://dotnet.di.unipi.it/EcmaSpec/PartitionII/cont24.html, 10 pages, printed Feb. 9, 2004.
Microsoft Portable Executable and Common Object File Format Specification, Microsoft Corporation, Revision 6.0, Feb. 1999, 77 pages.
ECMA Specs—Part 2 (Metadata), Common Language Infrastructure (CLI) Partition II: Metadata Definition and Semantics, http://jilc.sourceforge.net/ecma_p2_cil.shtml, 177 pages, printed Feb. 19, 2004.

* cited by examiner

*Primary Examiner*—Jason Mitchell
(74) *Attorney, Agent, or Firm*—Trop, Pruner & Hu, P.C.

(57) ABSTRACT

A method and related apparatuses facilitate the compression of firmware modules that follow a portable executable (PE) format. An example method includes an operation of storing a firmware module in memory, wherein the firmware module follows a PE format, thus having subdivisions that include an MS-DOS header. The method also includes an operation of flattening the firmware module by replacing existing content within at least one field within the MS-DOS header with fill data that is more compressible than the existing content. For example, fill data may be loaded into an MS-DOS stub field within the MS-DOS header. Alternatively, the method may flatten the firmware module by ensuring that fill data occupies all fields within the MS-DOS header except for an lfanew field and an e-magic field. In some embodiments, additional or alternative operations to flatten the firmware module may be performed, such as loading fill data into one or more fields within an optional file header of the firmware module.

25 Claims, 3 Drawing Sheets

METHOD AND APPARATUS FOR REDUCING THE STORAGE OVERHEAD OF PORTABLE EXECUTABLE (PE) IMAGES

FIELD OF THE INVENTION

The invention relates generally to the field of data processing, and more particularly to a method and related apparatuses for reducing the storage overhead of portable executable (PE) images.

BACKGROUND

In a typical legacy data processing system, firmware provides the machine instructions that control the system when the system is being powered up or has been reset, but before an operating system (OS) is booted. That is, the firmware controls the pre-OS or pre-boot operations. Firmware may also control certain operations after the OS has been loaded, such as operations for handling certain hardware events and/or system interrupts. The firmware may handle pre-boot and post-boot operations through a set of routines referred to collectively as a basic input/output system (BIOS). The BIOS thus provides the interface between the hardware components of the system and software components such as the OS. Accordingly, firmware for a legacy system is generally written specifically for the hardware platform within which the firmware will operate.

Recently, however, a new model for an interface between platform firmware and higher-level software such as operating systems was announced. That model is known as the Extensible Firmware Interface (EFI). Version 1.10 of the EFI Specification, dated Dec. 1, 2002, may be obtained from the Internet at the following address (in which the characters "." and "/" have been replaced with the characters "+" and "=, " respectively, to prevent the address from operating as a hyperlink): www+intel+com=technoloav=efi=main specification+htm. The EFI specification defines a set of standard interfaces and structures to be provided by low-level platform firmware, for use in loading additional firmware and booting the OS.

Under the EFI model, firmware drivers and pre-OS applications should be formatted according to the portable executable (PE) format. The PE format is the file format that Microsoft Corporation adopted as the standard format to be used for executable files to run under operating systems such as Microsoft® Windows® NT, Microsoft® Windows® XP, Microsoft®Windows® 2000, and Microsoft Windows CE®. The term "portable executable" reflects an intention to provide a common format for executable files for multiple operating systems. PE files may run on multiple different hardware platforms, including 32 bit architectures and 64 bit architectures. Microsoft® linkers can be used to generate executable files in the PE format from object files in the Common Object File Format (COFF). COFF is the file format used for object files generated by Microsoft® compilers. The PE format and the COFF format are both described in revision 6.0 of the "Microsoft Portable Executable and Common Object File Format Specification," dated February 1999 (the "PE/COFF Specification"), available at the following address (in which the characters "." and "/" have been replaced with the characters "+" and "=," respectively, to prevent the address from operating as a hyperlink): www+microsoft+com=hwdev=download=hardware=PECOFF+doc.

Platform frameworks based on the EFI model, such as the Intel® Platform Innovation Framework for EFI, are expected to supplant frameworks based on the BIOS model within the next few years as the frameworks of choice for designing, building, and operating data processing systems. The Intel® Platform Innovation Framework for EFI includes low-level firmware which provides boot and runtime service calls that are available to the operating system and its loader. Since the Intel® Platform Innovation Framework for EFI comports with the EFI specification, the core services of that framework provide a standard environment for operations such as loading firmware drivers, running pre-OS applications, and booting an OS. In addition, the Intel® Platform Innovation Framework for EFI defines a modular platform framework.

BRIEF DESCRIPTION OF THE DRAWINGS

The features and advantages of the present invention will become apparent from the following detailed description of one or more example embodiments of the present invention, in which.

DETAILED DESCRIPTION

Figure 1:
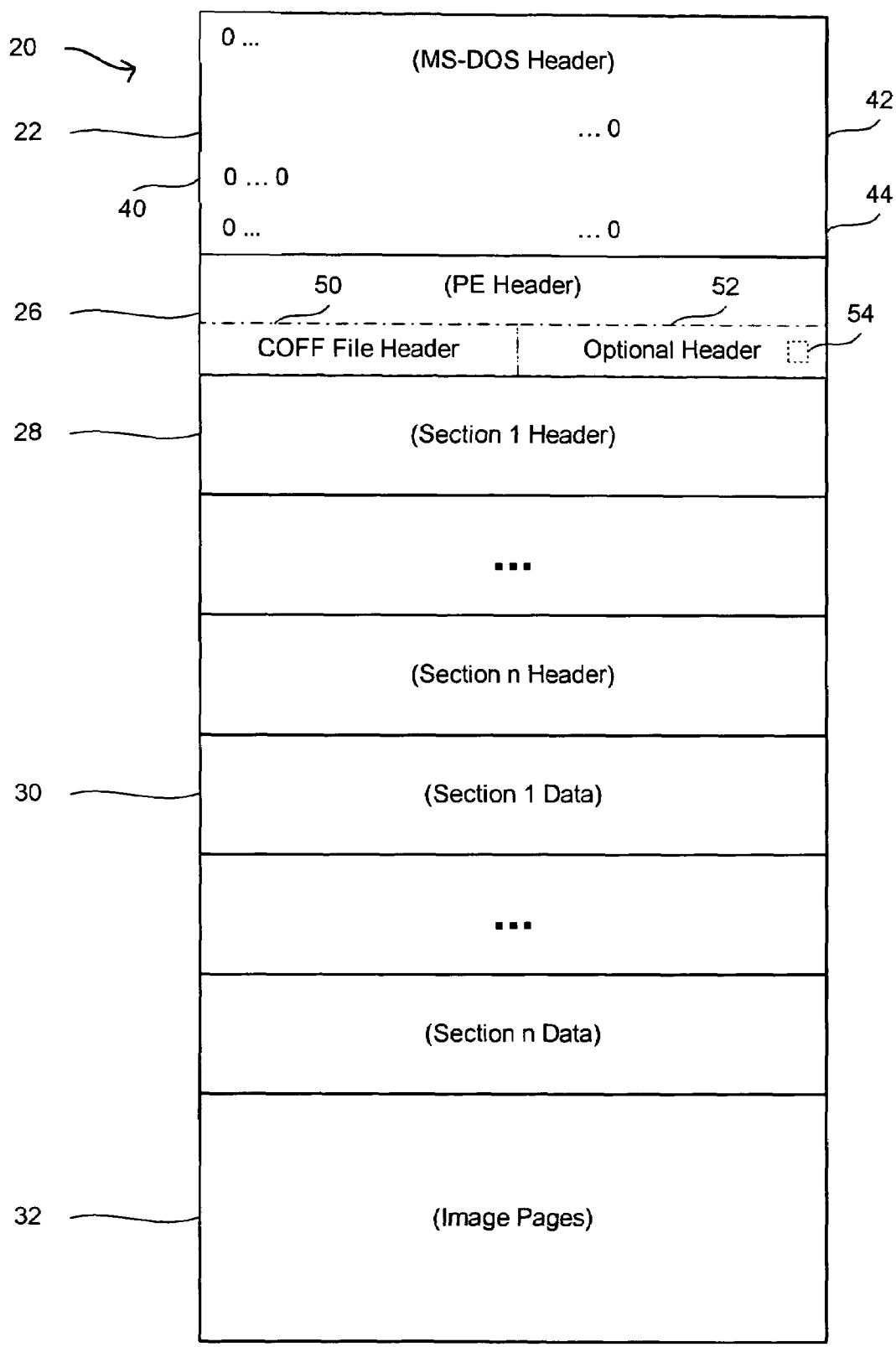
FIG. 1 is a block diagram illustrating an example embodiment of a PE image that has been processed according to embodiments of the present invention.

The EFI specification recognizes the boot environment and the runtime environment as two distinct execution environments within a data processing system. Within the boot environment, the EFI specification provides for a class of services known as boot services. The boot services include various interfaces and protocols that provide an OS loader with access to platform capabilities required to complete OS boot. The boot services are also available to drivers and applications that need access to platform capability. In general, the boot services, and thus the boot environment, are terminated once the operating system takes control of the platform. In addition, the EFI specification provides for a class of services known as runtime services. The runtime services include interfaces that provide access to underlying platform-specific hardware that may be useful during OS runtime, such as timers. The runtime services are available during the boot process, but also persist after the OS loader terminates boot services.

The EFI specification also provides for a variety of different types of executable images that may be loaded and executed within the boot environment. Those image types include EFI applications, EFI drivers, and EFI OS loaders. An EFI application is modular code that may be loaded in the boot environment to accomplish platform-specific tasks within that environment. Examples of possible EFI applications may include platform specific firmware features, utilities, diagnostics, and disaster recovery tools shipped with a platform to run outside the OS environment. An EFI driver is a module of code inserted into the boot environment via EFI boot or runtime services or protocols. EFI drivers should not be confused with OS drivers, which are modules that load to provide device support after the OS takes control of the platform. EFI drivers may provide device support during the boot process or they may provide platform services. Examples of possible EFI drivers may include central processing unit (CPU) drivers, chipset drivers, etc. A processing system may load EFI images from a flash memory device or other expensive non-volatile storage, for example.

For purposes of this disclosure, the term "firmware module" means any EFI image, such as an EFI application, an EFI driver, an EFI OS loader, or an EFI boot manager, that is able to execute within the boot environment of an EFI-enabled system. Under the EFI model, the firmware modules may be stored in any suitable storage medium, such as read only memory (ROM), floppy disk, hard disk, and optical disk. For purposes of this disclosure, the term "ROM" may be used in general to refer to non-volatile memory devices such as electrically programmable ROM (EPROM), electrically erasable programmable ROM (EEPROM), flash ROM, flash memory, etc. Furthermore, firmware modules may be retrieved from local storage or from remote storage, such as from a network server. As explained above, under the EFI model, firmware modules should be formatted according to the portable executable (PE) format. Thus, the PE format influences how much space needs to be provided on a ROM device to accommodate all of the firmware modules to be loaded into the boot environment from that ROM device. For instance, a PE image may include 504 bytes of overhead preceding the image pages. By contrast, legacy firmware drivers that load under the BIOS model are generally not formatted according to the PE format, but instead use formats that require little if any overhead, in terms of storage space. Moreover, ROM devices with greater capacity are generally more expensive than ROM devices with less capacity. Also, the EFI model provides a modular firmware architecture, in which the firmware for a particular system may be provided as thirty or more individual modules encoded according to the PE format. Consequently, a significant portion of the cost of EFI-enabled systems may tie directly to the cost of ROM devices with sufficient capacity to accommodate the associated overhead. For example, if a system has 30 firmware modules with 504 bytes of overhead in each, the aggregate overhead for those modules may exceed 15,000 bytes.

In circumstances such as these, it may be beneficial to compress firmware modules. As defined in the Microsoft Press Computer Dictionary, Fourth Edition, dated 1999, to compress is "to reduce the size of a set of data, such as a file or a communications message, so that it can be stored in less space or transmitted with less bandwidth." For example, a compression algorithm may be used to compress firmware modules before the images are stored in ROM. A corresponding decompression algorithm may then be used to decompress the compressed images, for instance when the firmware modules are needed during the boot process. Compressing the firmware modules may reduce the amount of non-volatile data storage required to store the firmware modules. That is, by compressing firmware modules before storing them, it may be possible to increase, in effect, the capacity of a given ROM device. Consequently, processing systems and components for such systems may be built with smaller and less expensive non-volatile data storage devices, which may reduce overall system cost.

Furthermore, by manipulating or modifying the content of a firmware module before compressing that module, it may be possible to increase the effectiveness of the compression. For purposes of this disclosure, the term "flatten" means to manipulate or modify the content of a data structure, or a portion of a data structure, in a way that increases the compressibility of that data structure. For example, a field that contains a string of different characters may be flattened by replacing that content with a homogeneous string, such as all zeros. Accordingly, when considered in isolation, the operation of flattening may not immediately affect the size of a data set such as a PE image. Nevertheless, flattening allows the data to be compressed more effectively.

This disclosure describes an example process in which various subdivisions or portions of a firmware module are flattened by replacing some or all of the existing data in those subdivisions with fill data. Consequently, the disclosed process allows firmware modules to be compressed more effectively and stored in smaller storage devices. For purposes of brevity and clarity, the fill data is generally characterized herein as zeros (otherwise known as nulls). In alternative embodiments, however, other fill values or flattening techniques may be used to increase the compressibility of firmware modules. For instance, a string containing a repeated single character or pattern of characters may be used as fill data. Any other type of fill data may be used in alternative embodiments, as long as the fill data results in improved compression for the firmware module.

However, as recognized by the present invention, care must be taken so that any modifications to a firmware module do not adversely affect the execution of that module within the EFI environment. An example embodiment of a process for flattening firmware modules without adversely affecting the execution of those modules is described below, following descriptions of (a) the basic structure of an example PE image and (b) an example embodiment of a suitable data processing environment in which certain aspects of the invention may be implemented.

FIG. 1 is a block diagram illustrating an example embodiment of a firmware module 20 formatted as a PE image 20. As illustrated, PE image 20 includes an MS-DOS header 22, a PE header 26, one or more section headers 28, one or more corresponding section data subdivisions 30, and one or more image pages 32. The blocks in FIG. 1 depict the relative positions of those subdivisions within PE image 20. However, the blocks do not necessarily reflect the respective sizes of the subdivisions. In addition, solid lines are used to depict the boundaries of the major subdivisions, and dashed lines are used to depict smaller components within the major subdivisions.

Thus, as depicted, MS-DOS header 22 includes an MS-DOS stub 40, an lfanew field 42, and an e-magic field 44. Lfanew field 42 may occupy 4 bytes, starting at location 0x3c in one embodiment (where the prefix 0x denotes a hexadecimal number). Lfanew field 42 may contain a 4 byte unsigned integer offset to the PE signature. This value may be set by the linker when the firmware module is linked. E-magic field 44 may occupy 4 bytes, starting at the offset specified in lfanew field 42. The PE signature referenced above may be stored in those 4 bytes. As also shown, PE header 26 may include a COFF header 50 and an optional header 52. COFF header 50 and optional header 52 may include various fields 54, as described below with reference to FIG. 3.

Figure 2:
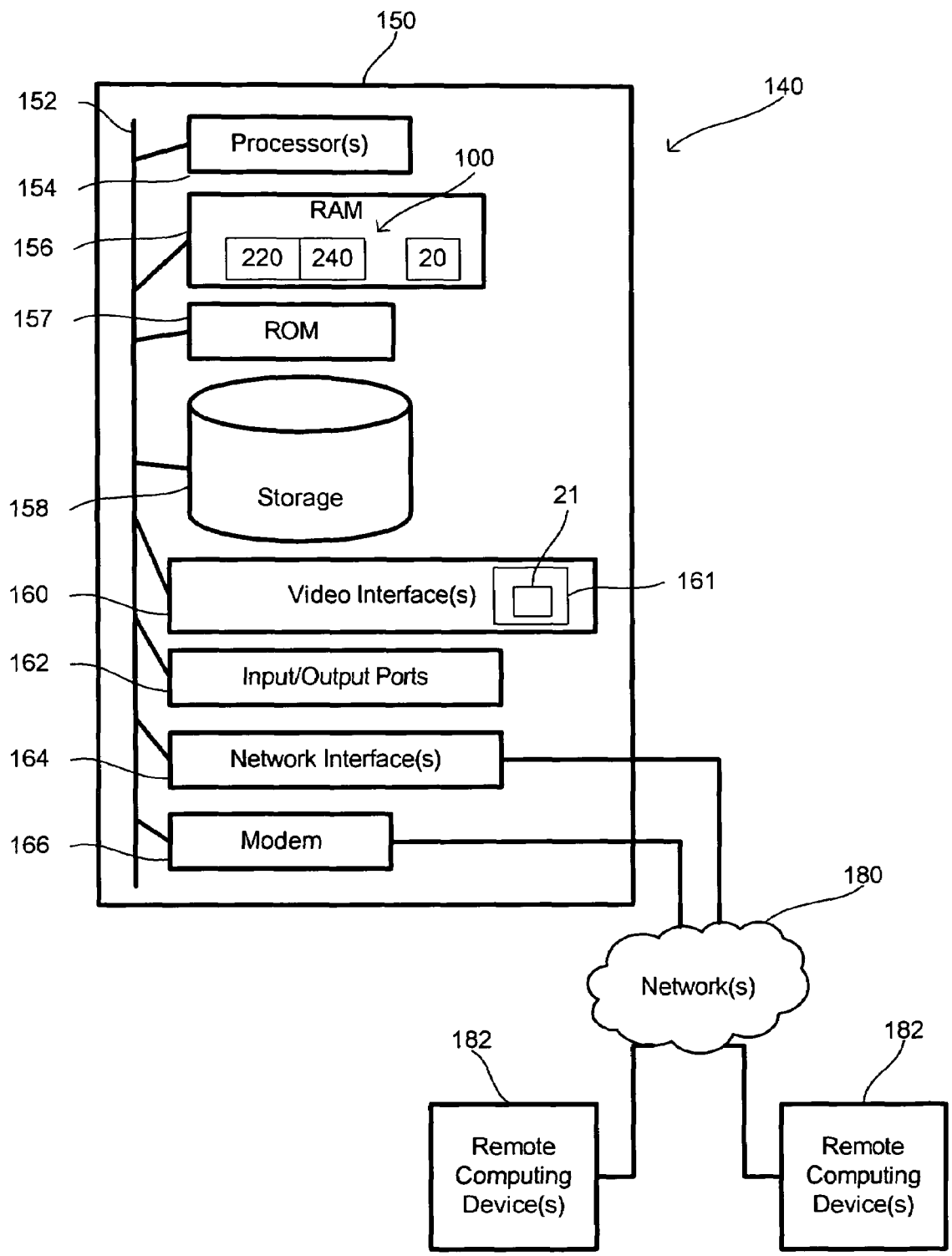
FIG. 2 is a block diagram depicting an example embodiment of a suitable data processing environment in which certain aspects of the invention may be implemented.

FIG. 2 and the following discussion are intended to provide a brief, general description of a suitable environment in which certain aspects of the illustrated invention may be implemented. As used herein, the term "machine" is intended to broadly encompass a single machine, or a system of communicatively coupled machines or devices operating together. Exemplary machines include data processing systems such as personal computers, workstations, servers, portable computers, tablets, telephones, Personal Digital Assistants (PDAs), handheld devices, etc.

In FIG. 2, for example, the data processing environment 100 may include a machine or processing system 140 that includes a system bus 152 communicatively coupled to one or more processors 154 and to one or more volatile or non-volatile data storage devices. Those data storage devices may include, for instance, random access memory (RAM) 156, ROM 157, mass storage devices such hard disk drives 158, and/or other devices or media, such as floppy-disks, optical storage, tapes, flash memory, memory sticks, digital video disks, biological storage, etc. Additional components may also be coupled to system bus 152, such as one or more video interfaces 160 and one or more input/output (I/O) interface ports 162. For example, video interface 160 may be implemented as an adapter card with an interface, such as a peripheral connect interface (PCI) connector, for communicating with system bus 152. Video interface 160 and other components may also include non-volatile storage devices, such as ROM 161, with one or more firmware modules 21 stored therein.

Processing system 140 may be controlled, at least in part, by input from conventional input devices, such as keyboards, mice, etc., and/or by directives received from another machine, interaction with a virtual reality (VR) environment, biometric feedback, or other input sources or signals.

Processing system 140 may include embedded controllers, such as programmable or non-programmable logic devices or arrays, application specific integrated circuits (ASICs), embedded computers, smart cards, and the like. Processing system 140 may utilize one or more connections to one or more remote machines 182, such as through a network interface 164, a modem 166, or other communicative coupling. Machines may be interconnected by way of a physical and/or logical network 180, such as a local area network (LAN), a wide area network (WAN), an intranet, the Internet, etc. One skilled in the art will appreciate that communications involving network 180 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be stored in volatile and/or non-volatile data storage.

For instance, in the illustrated embodiment, RAM 156 includes one or more instruction sets 100 for flattening firmware modules. At times, RAM 156 may also include one or more copies of PE image 20, for instance in various stages of modification. RAM 156 may receive instruction set 100 and PE image 20 from any suitable source, including without limitation from processor 152, from other data storage devices within processing system 150, or from one or more remote machines 182.

Figure 3:
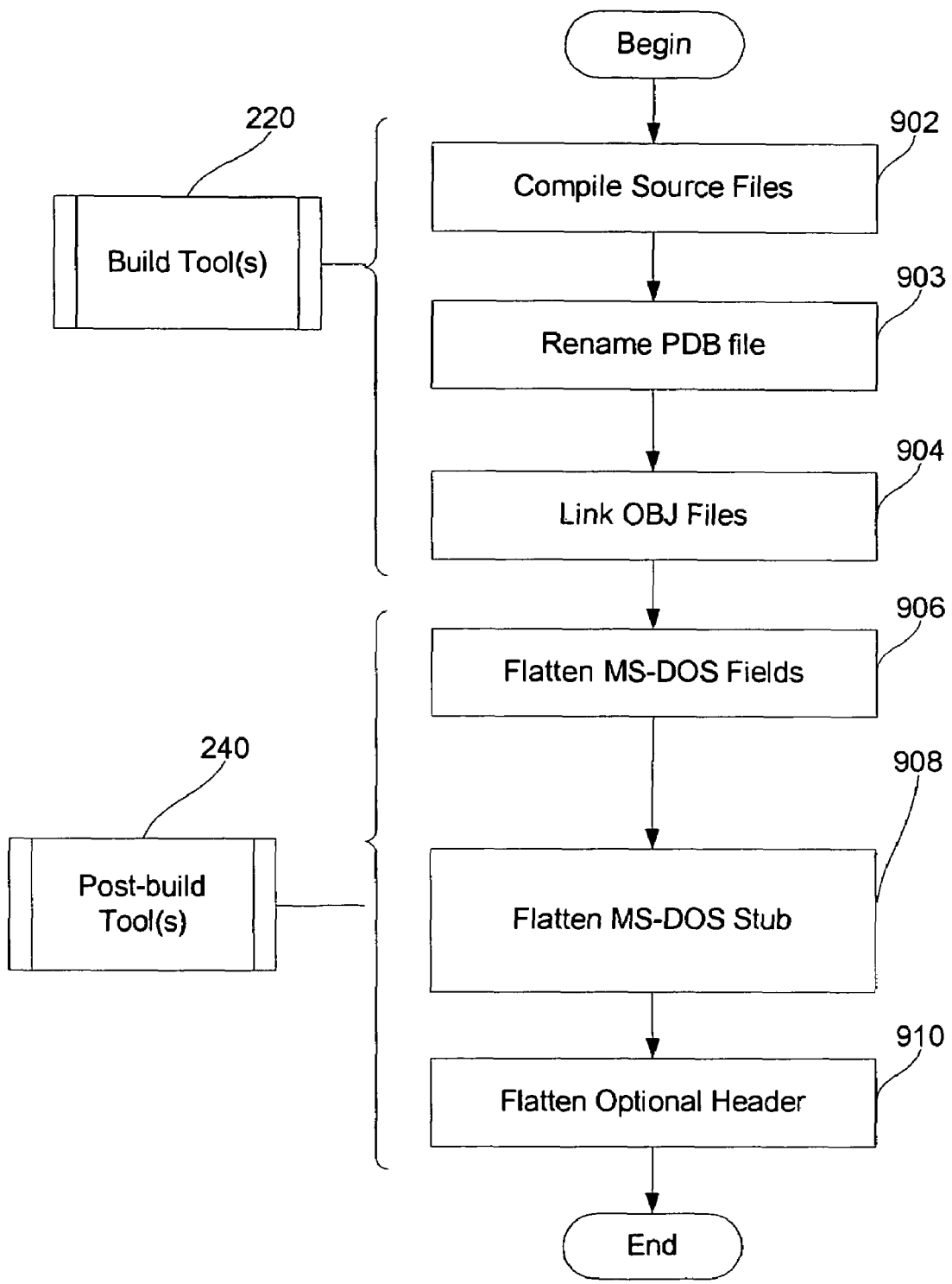
FIG. 3 is a flowchart illustrating an example embodiment of a process to facilitate compression of PE images, in accordance with one embodiment of the present invention.

FIG. 3 is a flowchart illustrating an example embodiment of a process to facilitate compression of firmware modules, in accordance with the present invention. The process may be performed in association with compiling and linking source code to create a PE image encoding firmware module 20. For example, the process of FIG. 3 may begin with one or more source code files having been written for the firmware module 20. As depicted at block 902, those source files may then be compiled into one or more object code files, for instance through use of a compiler distributed by Microsoft Corporation or a compiler distributed by Intel Corporation. The object code files may be formatted according to the COFF format.

In one embodiment, some of the operations for flattening firmware module 20 may be controlled by one or more build tools 220, and other such operations may be controlled by one or more post-build tools 240. Build tool 220 and post-build tool 240 may be referred to collectively as instruction set or control logic 100. As described in greater detail below, build tool 200 may provide instructions and parameters for a linker to link the object code files into a single, executable image and for other operations. Object files may be converted into an executable image through use of any suitable linker, such as a linker distributed by Microsoft Corporation, for instance.

In one embodiment, build tool 220 is implemented as a script or other set of instructions for specifying the object files to be linked and certain parameters to influence the link process. In alternative embodiments, a less automated process may be used. For example, an individual such as a code developer may manually set various parameters and initiate various operations within a more interactive process.

In the illustrated process, before the linker builds an executable image from the object files, build tool 220 may rename a debug file to be used by the linker, such as a program database (PDB) file, from its original name to a shorter name, as shown at block 903. For example, a "WatchDogTimer.PDB" file may be renamed to "A.PDB." In one embodiment, build tool 220 may receive one or more original debug file names from the compiler and may automatically generate one or more corresponding new, shorter names. Further, build tool 220 may automatically prevent collisions in the new names, using any suitable technique, and build tool may therefore rename multiple debug files for a single PE image. Since the linker places the names of debug files such as PDB files in the section data subdivisions of the PE image, shortening the names of the debug files before linking the object files will increase the compressibility of the PE image generated by the linker.

As shown at block 904, build tool 220 may then pass flags or parameters to the linker and execute the linker to generate firmware module 20 as an executable file, encoded as a PE image 20. Specifically, in one embodiment, the object files may include multiple sections, corresponding to section headers 28 in FIG. 1, and build tool 220 may cause two or more of the sections to be merged together. For each section that is merged into another, the value n in FIG. 1 is reduced by one. Since each section header 28 occupies 40 bytes, merging sections causes a reduction in the size of the PE image 20 produced by the compiler. In one embodiment, the flags that build tool 220 passes to the linker cause the linker to create a PE image 20 with only two sections—one section for all of the code and data, and the other section, generally known as the ".reloc" section, for the relocation information.

Such an approach would not be used when generating executable images to be used in an OS present environment because there are advantages to separating code from data in such an environment. For instance, the OS can mark code pages as execute only, read-only data pages as read-only, and read-write data pages as read-write. However, the Intel® Platform Innovation Framework for EFI environment executes in protected mode with flat descriptors. Consequently, the advantages of using separate sections may be reduced or eliminated, and sections in an executable image for such an environment may be merged as described above without negative side effects.

The flags that build tool 220 passes to the linker may also cause the linker to rename the section for the code and data to a single character (e.g., "T"), with the remaining characters set to zero. For example, ".text," ".data," and ".rdata" sections may all be merged together into a section named "T." This technique increases the compressibility of the section header 28 for the merged section. In the example embodiment, the name for the ".reloc" section may be left unchanged, so the Intel® Platform Innovation Framework for EFI image loader can use that name to find relocations.

In one embodiment, the following set of flags may be used to cause the linker to merge sections and assign a short section name, as described above: LINK_PROJ_FLAGS=/LTCG/ ALIGN:32/MERGE:.text=T/MERGE:.data=T/MERGE:. rdata=T An artifact of the object files that the linker places in the PE image is the file path to the PDB file. This file path is typically very long because it contains a full directory path to the PDB file. This file path is stored as an American Standard Code for Information Interchange (ASCII) string in the PE image. In an example embodiment of the present invention, build tool 220 may also pass flags to the linker to cause the linker to store an alternate, shorter file path for the PDB file or files. For example, a PDB switch may be used to specify an alternate path, such as "S:\," for a long, original file path. When combined with the operation of renaming PDB files with shorter names, the method may result in a PE image that includes "S:\A.PDB" instead of "C:\Project\Framework\Platform\ IntelTIa\D123XYZProduction\Build\IA32\WatchDogTimer. PDB," for instance. In such a case, over 70 bytes may be saved in the compressed PE image, relative to a compressed PE image that was not first flattened in this manner.

After the compiler has generated PE image 20 from the object files in accordance with the parameters described above, post-build tools 240 may further flatten PE image 20. The operations to further flatten PE image 20 may include flattening one or more fields in MS-DOS header 22, as depicted at block 906. In one embodiment, all flags in MS-DOS header 22 are filled with zeros, except for lfanew field 42 and e-magic field 44. As depicted at block 908, if MS-DOS stub 40 was not flattened in the previous step, post-build tool 240 may flatten MS-DOS stub 40 as well, for instance by filling MS-DOS stub 40 with zeros. In a conventional PE image, the MS-DOS stub would typically contain a program capable of executing under the MS-DOS® OS. However, since a firmware module need not run under that OS according to the Intel® Platform Innovation Framework for EFI, MS-DOS stub 40 may safely be flattened as described above. Thus, in one embodiment, 178 bytes of a 184-byte-long MS-DOS header 22 are zeroed, which may greatly improve the compressibility of that portion of PE image 20.

As shown at block 910, post-build tool 240 may then flatten certain fields within COFF file header 50 and/or optional header 52. For instance, in one embodiment, post-build tool 240 may load zeros into the following fields within COFF header 52: SizeOfStackReserve, SizeOfStackCommit, SizeOfHeapReserve, SizeOfHeapCommit, and LoaderFlags. These operations may further increase the compressibility of PE image 20.

Post-build tools 240 may then end. Additional firmware modules may also be flattened accordingly, and the flattened firmware modules may be compressed and loaded into ROM using any suitable tools or algorithms. Flattening operations such as those described herein may have the effect of significantly reducing the size of the ultimate compressed images of the firmware modules.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although an example process has been described with regard to particular operations performed in a particular sequence, it will be apparent to those of ordinary skill in the art that numerous modifications to that process could be applied to derive numerous alternative embodiments of the present invention. For example, alternative embodiment may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such wires, optical fibers, microwaves, radio waves, and other electromagnetic or optical carriers. Accordingly, instructions and other data may be delivered over transmission environments, including network 180, in the form of packets, serial data, parallel data, propagated signals, etc., and may be used in a distributed environment, and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, however, it should be understood that many of the components may be implemented as hardware, software, or combinations of hardware and software for providing the functionality described and illustrated herein.

In addition, some embodiments of the invention may include instructions for flattening firmware modules. Other embodiments may include firmware modules that have been flattened in accordance with the present disclosure. Additional embodiments may include processing systems that contain firmware modules that have been flattened in accordance with the present disclosure. Other embodiments may include adapter cards or other components for a processing system, with flattened firmware modules residing on those components.

In addition, the invention is not limited to any particular hardware architecture, but may be practiced in association with a wide variety of architectures, including 32-bit architectures and 64-bit architectures.

In view of the wide variety of permutations to the embodiments described herein or otherwise readily apparent to those skilled in the art, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method comprising:
    merging .text, .data, and .rdata sections, each including a header, from an object file into one new section of a firmware module, wherein (a) the new section includes a first name, data, executable code, and no more than a single header and (b) the firmware module follows a portable executable (PE) format having subdivisions that include an MS-DOS header;

renaming the new section to a second name that contains fewer unique characters than the first name;

storing the firmware module in memory, wherein the stored module includes the new section, another section including relocation information, and no additional section; and flattening the firmware module by replacing existing content within at least one field within the MS-DOS header of the firmware module with fill data that is more compressible than the existing content.

2. A method according to claim 1, wherein the operation of flattening the firmware module comprises loading fill data into an MS-DOS stub field within the MS-DOS header.

3. A method according to claim 1, wherein the operation of flattening the firmware module comprises ensuring that fill data occupies all fields within the MS-DOS header except for an lfanew field and an e-magic field.

4. A method according to claim 1, wherein the PE format also includes an optional file header, the method further comprising: loading fill data into at least one field within the optional file header.

5. A method according to claim 4, wherein the operation of loading fill data into at least one field within the optional file header comprises:

loading fill data into at least one of a SizeOfStackReserve field, a SizeOfStackCommit field, a SizeOfHeapReserve field, a SizeOfHeapCommit field, and a LoaderFlags field.

6. A method according to claim 1, wherein the operation of merging at least two sections from an object file into one section in the firmware module comprises instructing a linker to merge the at least two sections when generating the firmware module from the object file.

7. A method according to claim 6, further comprising: causing the linker to change a name of a section specified in the object file to a more compressible name.

8. A method according to claim 1, wherein the PE format also includes an image page, the method further comprising:

storing, in the image page, an alternate file path for a debug file associated with the firmware module, wherein the alternate file path is more compressible than an original file path for the debug file.

9. A method according to claim 1, wherein the PE format also includes an image page, the method further comprising:

instructing a linker to store, in the image page of the firmware module, an alternate file path for a debug file associated with the firmware module, wherein the alternate file path is more compressible than an original file path for the debug file.

10. A method according to claim 1, wherein the unmodified firmware module includes material necessary for the module to properly execute and perform a specific function, and the method further includes flattening the material to produce a modified firmware module still configured to properly execute and perform the specific function.

11. A method according to claim 10, wherein the flattened material is configured to be executed during boot services.

12. A method according to claim 1 including using a postbuild tool to flatten a field included in a Common Object File Format (COFF) file header; wherein flattening includes modifying content included in the COFF file header to increase the compressibility of the COFF file header.

13. A program product comprising:
a machine accessible storage medium; and
instructions encoded in the machine accessible medium, wherein the instructions, when executed by a processing system, cause the processing system to perform operations comprising:

merging .text, .data, and .rdata sections, each including a header, from an object file into one new section of a firmware module, wherein (a) the new section includes a first name, data, executable code, and no more than a single header and (b) the firmware module follows a portable executable (PE) format having subdivisions that include an MS-DOS header;

renaming the new section to a second name that contains fewer unique characters than the first name;

accessing the firmware module within the processing system; and flattening the firmware module by replacing existing content within at least one field within the MS-DOS header of the firmware module with fill data that is more compressible than the existing content.

14. A program product according to claim 13, wherein the operation of flattening the firmware module comprises loading fill data into an MS-DOS stub field within the MS-DOS header.

15. A program product according to claim 13, wherein the operation of flattening the firmware module comprises ensuring that fill data occupies all fields within the MS-DOS header except for an lfanew field and an e-magic field.

16. A program product according to claim 13, wherein the PE format also includes an optional file header, the program product further comprising:

instructions which, when executed by the processing system, cause the processing system to load fill data into at least one field within the optional file header.

17. A program product according to claim 16, wherein the operation of loading fill data into at least one field within the optional file header comprises:

loading fill data into at least one of a SizeOfStackReserve field, a SizeOfStackCommit field, a SizeOfHeapReserve field, a SizeOfHeapCommit field, and a LoaderFlags field.

18. A processing system with resources for flattening a firmware module, the processing system comprising:

a processor;

memory communicatively coupled to the processor; and instructions stored in the memory, wherein the instructions, when executed by the processor, cause the processing system to perform operations comprising:

merging .text, .data, and .rdata sections, each including a header, from an object file into one new section of a firmware module, wherein (a) the new section includes a first name, data, executable code, and no more than a single header and (b) the firmware module follows a portable executable (PE) format having subdivisions that include an MS-DOS header;

renaming the new section to a second name that contains fewer unique characters than the first name;

accessing the firmware module within the processing system; and flattening the firmware module by replacing existing content within at least one field within the MS-DOS header of the firmware module with fill data that is more compressible than the existing content.

19. A processing system according to claim 18, wherein the operation of flattening the firmware module comprises loading fill data into at least fifty bytes of the MS-DOS header.

20. A processing system according to claim 18, wherein the operation of flattening the firmware module comprises loading fill data into an MS-DOS stub field within the MS-DOS header.

21. A processing system according to claim 18, wherein the operation of flattening the firmware module comprises ensuring that fill data occupies all fields within the MS-DOS header except for an lfanew field and an e-magic field.

22. An apparatus comprising:
a machine accessible storage medium; and
a firmware module encoded in the machine accessible medium, the firmware module having a portable executable (PE) format with subdivisions that include an MS-DOS header, wherein the firmware module was produced by operations comprising:
merging .text, .data, and .rdata sections, each including a header, from an object file into one new section of a firmware module, wherein the new section includes a first name, data, executable code, and no more than a single header, follows the portable executable (PE) format having subdivisions that include the MS-DOS header;
renaming the new section to a second name that contains fewer unique characters than the first name; and
flattening the firmware module by replacing existing content within at least one field within the MS-DOS header of the firmware module with fill data that is more compressible than the existing content.

23. An apparatus according to claim 22, further comprising:
a processor communicatively coupled to the machine accessible medium;
memory communicatively coupled to the processor; and
instructions stored in the memory, wherein the instructions, when executed by the processor, cause the processing system to perform operations comprising:
retrieving the firmware module from the machine accessible medium; and
executing the firmware module within a boot environment.

24. An apparatus according to claim 22, wherein:
the machine accessible medium comprises a non-volatile storage device; and
the apparatus further comprises an interface in communication with the non-volatile storage device, the interface operable to provide communication between the non-volatile storage device and a processor of a data processing system.

25. An apparatus according to claim 24, wherein the apparatus comprises an adapter card for a processing system.

* * * * *